US009306294B2

(12) United States Patent
Charette et al.

(10) Patent No.: US 9,306,294 B2
(45) Date of Patent: Apr. 5, 2016

(54) SMART ANTENNA

(71) Applicants: Keith Charette, Fairfield, CT (US); Yongchun Zheng, Newtown, CT (US); Chris Miller, Kent, CT (US)

(72) Inventors: Keith Charette, Fairfield, CT (US); Yongchun Zheng, Newtown, CT (US); Chris Miller, Kent, CT (US)

(73) Assignee: VENTUS NETWORKS LLC, Norwalk, CT (US)

( * ) Notice: Subject to any disclaimer, the term of this patent is extended or adjusted under 35 U.S.C. 154(b) by 40 days.

(21) Appl. No.: 14/269,436

(22) Filed: May 5, 2014

(65) Prior Publication Data

US 2014/0329458 A1 Nov. 6, 2014

Related U.S. Application Data

(60) Provisional application No. 61/819,906, filed on May 6, 2013.

(51) Int. Cl.

| | |
|---|---|
| ***H04B 3/36*** | (2006.01) |
| ***H04B 7/14*** | (2006.01) |
| ***H01Q 21/28*** | (2006.01) |
| ***H01Q 1/00*** | (2006.01) |
| ***H01Q 21/20*** | (2006.01) |

(52) U.S. Cl.

CPC ............... *H01Q 21/28* (2013.01); *H01Q 1/007* (2013.01); *H01Q 21/205* (2013.01)

(58) Field of Classification Search

CPC ...... H04W 16/26; H01Q 21/28; H01Q 1/007; H01Q 21/205

USPC .................... 455/7, 557, 550.1, 562.1, 20, 22

See application file for complete search history.

(56) References Cited

U.S. PATENT DOCUMENTS

| | | | | |
|---|---|---|---|---|
| 6,600,900 | B1 | 7/2003 | Palinkas | |
| 6,728,554 | B1 * | 4/2004 | Wegner | 455/562.1 |
| 7,293,289 | B1 | 11/2007 | Loc et al. | |
| 8,160,036 | B2 * | 4/2012 | Smith et al. | 370/338 |
| 8,238,318 | B1 * | 8/2012 | Negus | 370/338 |
| 8,254,983 | B2 * | 8/2012 | Rofougaran | 455/550.1 |
| 8,300,590 | B1 * | 10/2012 | Negus et al. | 370/329 |
| 8,311,023 | B1 * | 11/2012 | Negus | 370/338 |
| 8,364,857 | B2 * | 1/2013 | Pyers et al. | 710/14 |
| 8,385,305 | B1 * | 2/2013 | Negus et al. | 370/338 |
| 8,457,013 | B2 * | 6/2013 | Essinger et al. | 370/254 |
| 8,502,733 | B1 * | 8/2013 | Negus et al. | 342/359 |
| 8,711,838 | B1 * | 4/2014 | Guichard et al. | 370/351 |

(Continued)

FOREIGN PATENT DOCUMENTS

WO 2006096863 9/2006

OTHER PUBLICATIONS

USB Implementers Forum, FAQ, http://www.usb.org/developers/usbfaq.

*Primary Examiner* — Marceau Milord

(74) *Attorney, Agent, or Firm* — Grogan, Tuccillo & Vanderleen, LLP

(57) ABSTRACT

A smart antenna apparatus includes a casing, which supports an omnidirectional antenna array; a plurality of transceivers electrically connected with the antenna array; and a format converter and booster device electrically connected between the plurality of transceivers and a network port, said format converter and booster device comprising a multiplexer/de-multiplexer circuit for encoding plural USB signals from the plurality of transceivers to the network port and for decoding plural USB signals from the network port to the plurality of transceivers.

9 Claims, 3 Drawing Sheets

(56) References Cited

U.S. PATENT DOCUMENTS

| | | | | |
|---|---|---|---|---|
| 8,751,655 | B2 * | 6/2014 | Arimilli et al. | 709/226 |
| 2002/0172290 | A1 | 11/2002 | Chorpenning et al. | |
| 2007/0211735 | A1 | 9/2007 | Williamson | |
| 2009/0248918 | A1 | 10/2009 | Diab et al. | |
| 2010/0309819 | A1 | 12/2010 | Sanchez et al. | |
| 2011/0026525 | A1 | 2/2011 | He | |
| 2012/0087301 | A1 | 4/2012 | Brandt et al. | |
| 2013/0044028 | A1 * | 2/2013 | Lea et al. | 342/359 |
| 2013/0059625 | A1 | 3/2013 | Clegg et al. | |

* cited by examiner

SMART ANTENNA

CROSS REFERENCE TO RELATED APPLICATIONS

The present application is a non-provisional from U.S. App. 61/819,906 filed May 6, 2013 and titled "SMART ANTENNA," and hereby incorporates herein by reference the disclosures thereof. The present application also is a continuation-in-part from U.S. application Ser. No. 13/737,051 filed Jan. 9, 2013 and titled "ROUTER," and hereby incorporates herein by reference the disclosures thereof.

BACKGROUND

1. Technical Field

Embodiments of the invention relate to wireless data networks. In particular, the invention provides for connections to wireless data networks from routers within secured facilities, e.g., TEMPEST certified facilities.

2. Discussion of Art

Certain organizations (e.g., financial institutions, electrical transmission operators, law firms, industrial research organizations, and the like) have multiple geographically dispersed locations where in the normal course of operations data must be securely stored and among which data must be securely communicated. Such organizations will be referred to hereafter as "data reliant organizations."

Data communication conventionally has been accomplished using landline (either copper or fiber cable) as well as wireless connectivity. Landlines are expensive to install and are relatively vulnerable to compromise whereas wireless connections can be established and modified relatively conveniently (therefore, cheaply); can provide mode redundancy (e.g. by multichannel transmission and reception, as disclosed in companion "ROUTER" application); and are perhaps less vulnerable to compromise (by spectrum-spreading or other intercept-resistant protocols, which also can enhance data throughput, again as disclosed in companion "ROUTER" application). Accordingly, it has become popular to provide for wireless data transmission among the dispersed locations of data reliant organizations.

For enterprise level and M2M use cases, cellular data connectivity at the endpoint is frequently implemented via a wireless router. Referring to FIG. 1, in a typical installation, a cellular-wireless router 10 forms a bridge between a commercial or proprietary wide-area network (WAN) and a TCP/IP compatible port or ports or other application specific I/O facilities. Typically, the cellular-wireless router includes a CPU, at least one cellular transceiver, an Ethernet PHY and either an integrated cellular antenna or connection facilities for an external cellular antenna 12. Connectivity between the router and associated/supported peripheral equipment 14 may be via metallic circuit, optical fiber, optical broadcast or wireless methods. All of these components are maintained within a secured location such as a datacenter 50.

However, in many installation scenarios where a router is to be co-located with other equipment in a secure location, it is impossible to achieve/maintain adequate wireless signal strength at the router to support reliable cellular router operation. Router installation in a subterranean datacenter facility may serve as one example, while an automated teller machine installed deep inside a building structure is another. In either case, a co-located antenna (as shown in FIG. 1) may provide inadequate signal access or none at all.

A logical and existing solution, as shown in FIG. 2, may be to move the router's separate antenna 12 to a location outside the datacenter 50, where there is improved wireless signal access, and to extend the RF signal over a sufficiently long network cable 30 from the antenna back to the router 10. In certain instances this approach is possible, but typically, the maximum distance between the router and antenna is severely limited by cable attenuation. Thin coax cables (eg: RG-178) can attenuate the signal of interest (1900 MHz for 3G service) by as much a 1 dB per foot of length. At this rate of attenuation, the energy loss doubles for every 3 feet of additional cable length and with typical cellular transceivers. Though signal distances can be improved by virtue of specialized, esoteric cable types, cable runs of more than about ten feet (3 m) can prove impractical in many real-world installations.

Another solution may be to move the router and antenna to a location with favorable signal access and accomplish the extended connection between router and connected equipment via TCP/IP (or LAN) baseband signal domain. This approach can serve well in some instances where the router's remote location is acceptable from a security and physical accommodation standpoint. However, in this configuration, the router generally will be placed in a non-secure or possibly public location and the LAN connectivity can be vulnerable to interception, interrogation or tampering. Additionally, the operating environment may be poorly, if at all controlled. Thus, this "solution" actually is just a restatement of the problems that can be resolved by putting the router in a controlled location.

Such a restatement of the original problem is of particular concern given recent discoveries about capabilities for remote infiltration of electronic devices, either for surveillance or sabotage. For example, common hardware components (e.g., cable connectors, memory chips) can be compromised by insertion of transponders that permit unauthorized wireless access to digital instructions or data, possibly from any location within more than fifty square miles surrounding the compromised component. Thus, such components can permit essentially undetectable server-side access to "clear" data, that is, data not protected by any encryption technology. This newly-public technology thereby enables covert monitoring and modification of critical data streams (e.g., financial account data and transfer instructions; electrical network load data and distribution breaker position commands).

Although only governmental possession of remote transponders has been publicized, it is highly likely that illicit actors also have obtained possession of similar technology, either by outright purchase, by subversion of government officers, or by reverse engineering. Accordingly, data reliant organizations are subject to a server-side risk of data interception or manipulation by bad actors. This is and will increasingly become a business-critical concern for data reliant organizations, particularly financial institutions.

Accordingly, it would be desirable for data reliant organizations to maintain critical data servers within a facility resistant to wireless penetration, e.g., a TEMPEST certified facility, while still retaining an ability to provide for wireless broadband communication among the critical data servers at the geographically dispersed locations.

Use of TEMPEST precautions raises and amplifies all of the issues discussed above with reference to router installation within a merely inconvenient location, as opposed to an intentionally shielded location.

BRIEF DESCRIPTION

Accordingly, the present invention provides a secure USB signal extension apparatus, which includes a first format converter and booster device disposed within a secure facility, and a second format converter and booster device disposed outside the secure facility. Each of the format converter and booster devices includes a plurality of USB ports, a network port, a multiplexer/de-multiplexer circuit for encoding signals from the plurality of USB ports to the network port, and for decoding signals from the network port to the plurality of USB ports, and a network cable connecting through a boundary of the secure facility the respective network ports of the first and second format converter and booster devices.

In certain embodiments, the invention provides a smart antenna apparatus within a casing, which supports an omnidirectional antenna array, a plurality of transceivers electrically connected with the antenna array, and a format converter and booster device electrically connected between the plurality of transceivers and a network port. The format converter and booster device includes a multiplexer/de-multiplexer circuit for encoding plural USB signals from the plurality of transceivers to the network port and for decoding plural USB signals from the network port to the plurality of transceivers.

In one aspect of the invention, it is installed as part of a secure wireless networking system, which includes a local router configured to establish a virtual private network with a remote router. The local router is disposed within a secure facility and includes a first format converter and booster device, which in turn includes a plurality of USB ports connected in communication with the router processor, a network port, and a multiplexer/de-multiplexer circuit for encoding plural USB signals from the USB ports to the network port, and for decoding plural USB signals from the network port to the plurality of USB ports. The system further includes a smart antenna disposed outside the secure facility and including a second format converter and booster device, a plurality of transceivers, and at least one antenna per transceiver. The second format converter and booster device includes a second plurality of USB ports each connected in communication with one of the transceivers, a second network port, and a second multiplexer/de-multiplexer circuit for encoding plural USB signals from the USB ports to the second network port, and for decoding plural USB signals from the second network port to the plurality of USB ports. The system further includes a network cable connected through a boundary of the secure facility between the network port of the first format converter and booster device within the local router and the second network port of the second format converter and booster device within the smart antenna.

These and other objects, features and advantages of the present invention will become apparent in light of the detailed description thereof, as illustrated in the accompanying drawings.

DRAWINGS

DETAILED DESCRIPTION OF THE DRAWINGS

Figure 1:
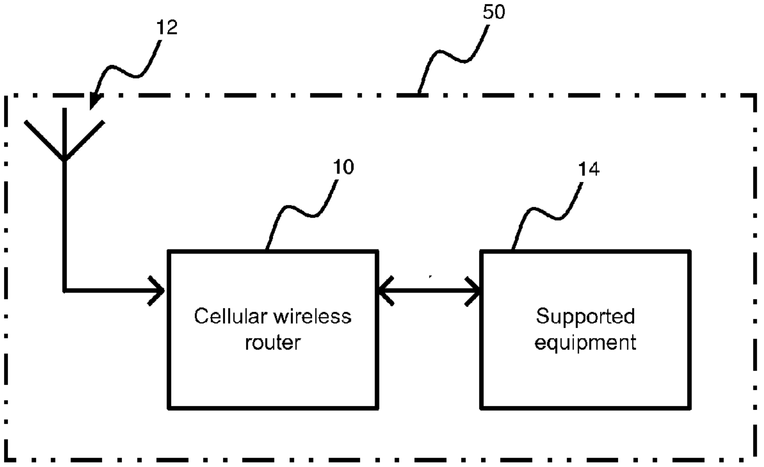
FIG. 1 shows in schematic view a conventional wireless broadband router system installed in a secure facility.
Figure 2:
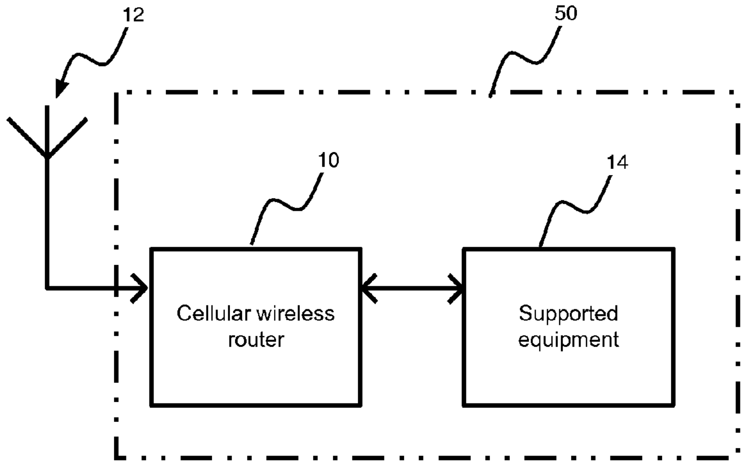
FIG. 2 shows in schematic view a wireless broadband router with remote antenna.
Figure 3:
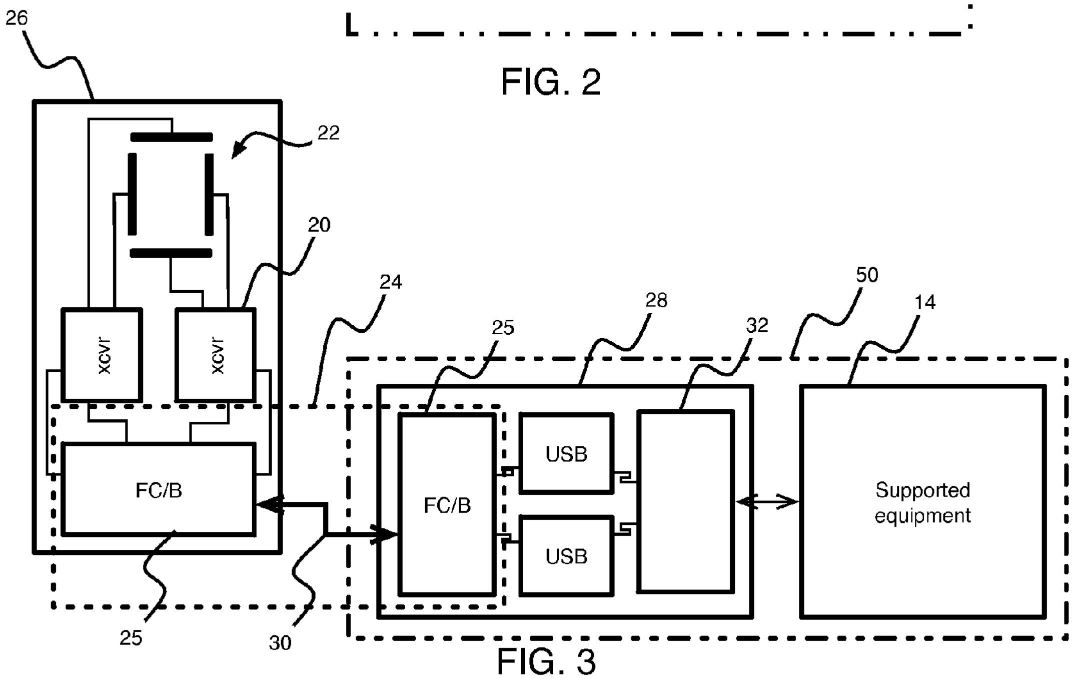
FIG. 3 shows in schematic view a broadband router and smart antenna according to an embodiment of the invention.

Referring to FIG. 3, an embodiment of the invention co-locates at least one off-the-shelf RF transceiver(s) 20 together with at least one antenna(s) 22 per transceiver, and together with a signal extension apparatus 24, to form a smart antenna assembly 26 that can be located remotely from a companion router assembly 28. In certain embodiments of the invention, such as shown, the antennas 22 may be arranged in an omnidirectional array for diversity of signal direction and polarization. Meanwhile, plural transceivers 20 may be provided for diversity of signal frequency.

Co-location of transceivers 20 and antennas 22, as shown in FIG. 3, eliminates the conventional problems with RF signal loss in long cable runs. Instead, communications occur in the baseband domain along the long cable 30 between the router 28 and its remotely located transceiver/antenna assembly 26. Typically, the cable 30 is unshielded twisted pair (UTP). However, coaxial cable is one of several conventional cable formats that also could be used.

Thus, a communication link according to an embodiment of the invention adapts industry standard, cellular RF transceivers to "category" network cable.

USB 2.0 is an interface protocol that is native to commercial transceivers and routers, which in typical wireless router assemblies will be mounted in close proximity on a common printed wiring assembly (PWA) or motherboard. Thus, USB connectivity is a natural choice for communication between co-located routers and transceivers.

However, it turns out that USB suffers signal loss and packet drop at distances in excess of 16 ft (about 5 m), so that USB connectivity between a router and a remote transceiver presents substantially the same problems as occur with an RF cable connection between a transceiver and a remote antenna. Accordingly, in one aspect of the invention, the signal extension apparatus 24 reformats USB signals between the smart antenna 26 and the router 28 to a proprietary protocol, which utilizes phase and amplitude modulation and amplification to accomplish long range transmission of data over the network cable 30. For example, the signal extension apparatus 24 permits communication at distances in excess of 10 m.

The signal extension apparatus 24 also permits transmission of power and mode-of-control signals between the transceivers 20 and the router 28, in parallel to the signal that encodes the USB packets, e.g., using Power over Ethernet (PoE) or the like technology. Advantageously, this co-transmission may mask the encoded USB packets. For example, the proprietary protocol implemented by the signal extension apparatus 24 may provide a relatively high voltage DC carrier signal (e.g., a constant center voltage within a range of 20 V-60 V), as well as a multi-level (i.e., more than binary) data protocol using amplitude, phase, and/or frequency shift keying. For example the data protocol may encode data by selecting among three, four, or six values of carrier voltage, along with shifting among eight different values of frequency, thereby encoding at least a byte of data in each time interval.

The signal extension apparatus 24 includes, in this embodiment, a pair of custom processors 25 that are configured as format converters/boosters ("FC/Bs"). The FC/Bs 25 bi-directionally convert and multiplex/de-multiplex between commercial USB 2.0 compliant signaling and the proprietary signaling protocol, which in certain embodiments is a single-channel protocol, although multi-channel signaling can also be accomplished on UTP. One of the FC/Bs 25 is disposed inside the case of the smart antenna assembly 26, and is connected between the transceivers 20 and the network cable 30, which may be unshielded twisted pair ("UTP") or similar commercial cable. The other of the FC/Bs 25 is disposed inside the case of the router assembly 28, and is connected between the network cable 30 and a router board 32.

Thus, one aspect of the invention is that the signal extension apparatus 24 enables transparent signaling between USB components, over a longer cable distance than is possible with the native USB signal's electrical characteristics and communication protocol.

Another aspect of the invention is that the signal extension apparatus 24 multiplexes the USB data packets with additional auxiliary signals that are necessary to support market available USB interfaced cellular transceiver modules. For example, the multiplexing can be accomplished by phantom circuit signaling in the common mode among alternate pairs of the UTP cable 30. These auxiliary signals provide operating mode control and internal system signaling. In typical router system implementations where remote antenna operation is not implemented, these baseband signals simply connect between the transceiver and the local processor.

In the inventive solution, these system signaling channels are multiplexed, along with the operating power for the remote antenna, together on the same cable 30 that carries the proprietary USB extension signal. In certain embodiments the operating power channel may provide a carrier for the baseband signal. In any case, the baseband system signal channels are not embedded in the USB packet domain, thus, do not represent any data security risk, since none of the USB data payload is accessible from the baseband channels. Therefore, integrity of a secure VPN channel can be maintained via USB.

For example, each FC/B 25 can be configured to de-multiplex multiple data streams from the single-channel proprietary signaling protocol, and to transmit digital signals to first and second USB connections. For example, in the smart antenna 26, the USB connections are direct to the transceivers 20; whereas in the local router 28, the USB connections are between the FC/B 25 and the router processor 32. Each FC/B 25 also can be configured to multiplex digital signals received via the first and second USB connections, and to transmit the multiplexed signals via network cable using the proprietary signaling protocol. In the other direction, the FC/B can be configured to receive a single stream of data from the network cable 30, and to split the stream of data into at least two interleaving substreams, each substream going to a different one of two or more RF transceivers 20 via corresponding USB connections.

In some embodiments, the paired FC/Bs can be configured to encode and decode in such a manner as to maintain one-to-one signal correspondence between the plurality of USB ports at the local router and the plurality of transceivers 20 at the smart antenna. However, it is equally possible to configure the paired FC/Bs to shuffle the signal packets, such that there is no reproducible correspondence between, e.g., the signal packets at the USB ports and the signal packets at the transceivers 20. In the latter case, the router processor 32 can be configured to tag each packet—prior to encoding by the local router FC/B 25—so that at the very far end of the wireless transmission from the smart antenna 26, after decoding by the smart antenna FC/B 25 and after VPN transmission via the cellular broadband network—a similarly-configured router processor (not shown) can reconstruct the shuffled packets to obtain the same data stream that was shuffled by the FC/Bs. It should be noted that packet shuffling can be accomplished both among the transceivers 20 (simple interleaving) and also timewise (limited random buffering).

In another embodiment (not shown), the connecting cable can be one or more standard 60 Hz AC power lines connected by plugs or splices, with powerline network adapters connecting the cable to the FC/Bs 25 in the smart antenna 26 and at the router 28. In such an embodiment, the boost function may be optional.

Figure 4:
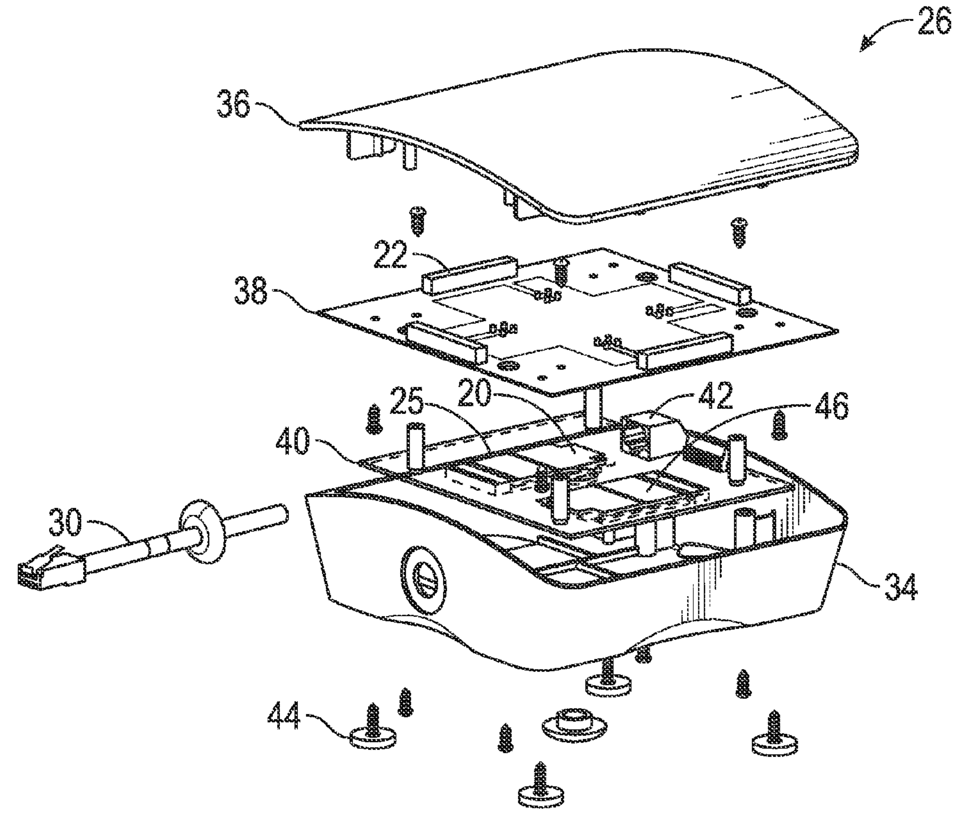
FIG. 4 shows in perspective view an assembly of a smart antenna according to an embodiment of the invention.

Referring to FIG. 4, working parts of the smart antenna assembly 26 are housed in a casing that comprises a tray 34 and a lid 36. The antennas 22 are mounted on their own PWA 38, and are connected by flex leads to the RF transceivers 20, which are mounted on a transceiver module motherboard 40 below the antenna PWA. The RF transceivers 20 are connected via the motherboard to the FC/B 25, also mounted on the motherboard. The FC/B 25 sends and receives USB 2.0 signals to the RF transceivers 20 while sending and receiving the proprietary baseband signal via a network port (e.g. a standard jack connection 42, such as an RJ-45 plug) to the UTP cabling 30. The tray 34 may include magnetic feet 44 for removably securing the assembly to building structure. The motherboard 40 may include slots for receiving SIM cards 46 to program the RF transceivers 20; alternatively, the RF transceivers may be dedicated to pre-determined channels and modes.

Independent of the baseband protocol that is used, the router 28 and smart antenna 26 are only a middle portion of a communications link between a local server and a remote server, which can be established within a secured environment such as IPsec or VPN. In case both the local server and the remote server are maintained in secure environments (e.g., TEMPEST certified facilities) then a risk of wireless penetration is substantially mitigated.

Figure 5:
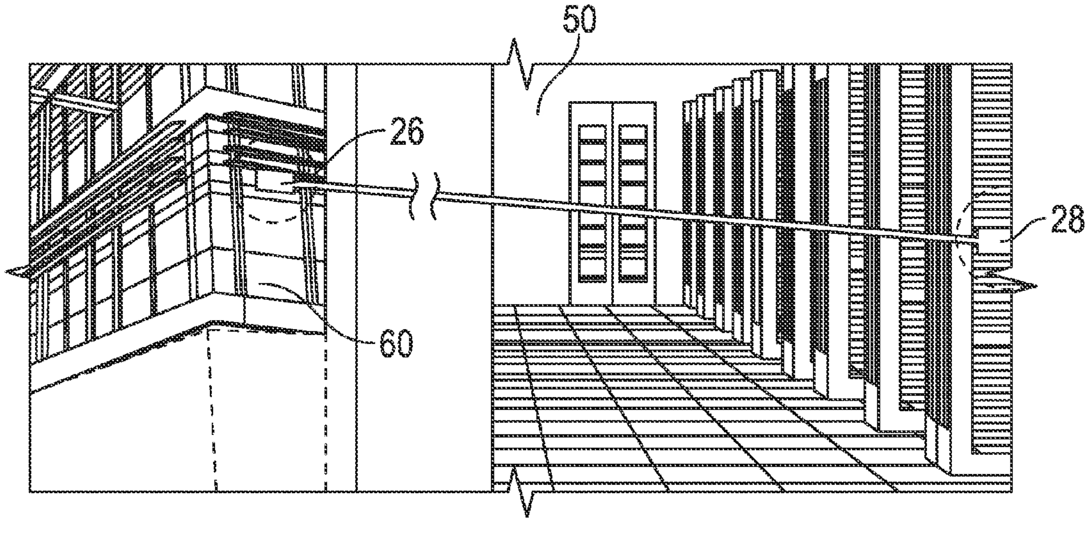
FIG. 5 shows in perspective view an installation of a broadband router and smart antenna according to an aspect of the invention.

By way of example, FIG. 5 shows an enterprise scenario in which the router 28 is securely located within a datacenter rack space 50, where it benefits from a well controlled environment and where network connectivity can occur in an area with limited/controlled access. The smart antenna assembly 26 is mounted in a location 60 where wireless signal strength will support reliable and predictable communications with a wireless broadband provider's base station.

Figure 6:
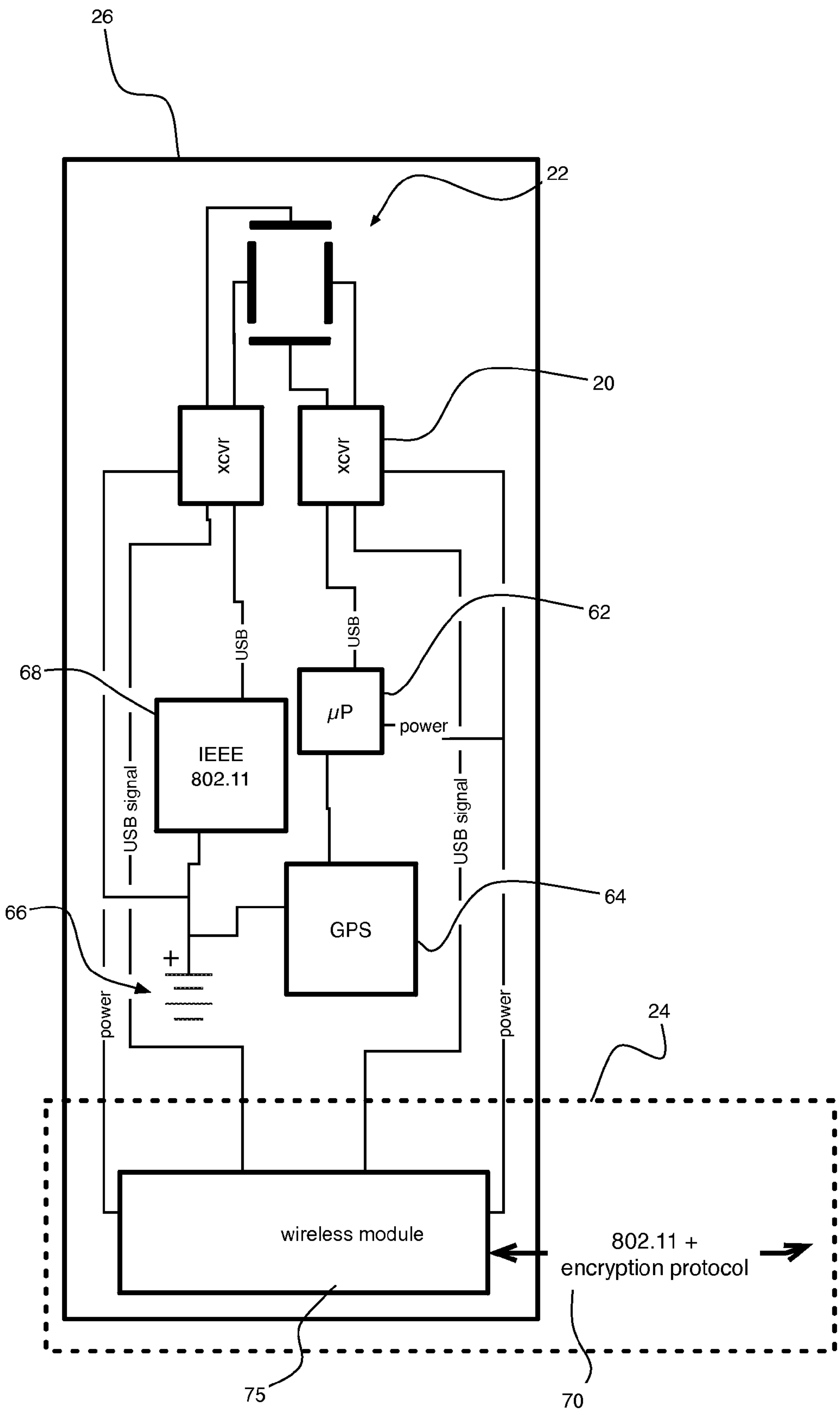
FIG. 6 shows in schematic view a smart antenna according to another embodiment of the invention.

In such an embodiment, it may be useful to provide within the smart antenna assembly 26 an autonomous microprocessor 62 (e.g., an ASIC, FPGA, RISC), as shown schematically in FIG. 6. The microprocessor within the smart antenna should be sufficient to support autonomous event triggered reporting—i.e. in response to a change in an operating condition of the smart antenna 26, such as a change in the GPS signal received at a GPS antenna and chip module 64, and/or in response to a loss of power or input data signal at the FCB 25, to detect unapproved equipment relocation and/or to provide (via at least one Sthe transceivers 20) periodic alerts such as pings of positional reporting. Such periodic pings will require onboard the smart antenna 26 an energy storage device 66 (e.g. a battery, ultracapacitor, or the like).

Additionally, it may be desirable to provide onboard the smart antenna 26 a wireless (e.g., IEEE 802.11) hotspot 68 for open data (i.e. use by customers or general public), unrelated to the companion router 28 that transmits secured data. Provision of the duplicate transceivers 20, transmitting on different channels and possibly to different providers, can permit total separation of open data from secured data.

Following from the idea of the wireless hotspot 68, it also may be useful (as further shown in FIG. 6) to substitute for the connecting cable 30 a wireless connection 70, using, e.g., a proprietary encrypted packeting scheme transmitted on 802.11-compliant frames. In such case, the signal extension apparatus 24 then will incorporate, in place of the FC/Bs 25, wireless modules 75 that implement a proprietary multi-band protocol for multiplexing the auxiliary signals and the USB data packets mentioned above. For example, each of the wireless modules may be compliant with IEEE 802.11. Further, the smart antenna 26 then will require local power (not shown) in place of power previously provided via the now-absent connecting cable. At the other end of wireless connection 70 (router 28, not shown in FIG. 7), a similar wireless module 75 will be provided.

Thus, relying on the security of the proprietary protocol implemented by the wireless modules 75, the secure wireless connection 70 can be used in place of the network ports 42 and connecting cable 30 that were discussed above with reference to FIG. 3.

Although exemplary embodiments of the invention have been described with reference to drawings, those skilled in the art will apprehend various changes in form and detail consistent with the scope of the invention as defined by the appended claims. For example, although a jack connection and UTP cabling are conventional for local area networks, it is equally feasible to provide screw terminal connections or coaxial cable or the like alternatives.

What is claimed is:

1. A secure wireless networking system comprising:

a local router configured to establish a virtual private network with a remote router, said local router disposed within a secure facility and comprising a first format converter and booster device, said first format converter and booster device comprising:
- a plurality of USB ports connected in communication with the router processor;
- a network port; and
- a multiplexer/de-multiplexer circuit for encoding plural USB signals from the USB ports to the network port, and for decoding plural USB signals from the network port to the plurality of USB ports;

a smart antenna disposed without the secure facility and comprising a second format converter and booster device, a plurality of transceivers, and at least one antenna per transceiver, said second format converter and booster device comprising:
- a second network port; and
- a second multiplexer/de-multiplexer circuit for encoding plural USB signals from the plurality of transceivers to the second network port, and for decoding plural USB signals from the second network port to the plurality of transceivers; and a network cable connected through a boundary of the secure facility between the network port of the first format converter and booster device within the local router and the second network port of the second format converter and booster device within the smart antenna.

2. The system as claimed in claim 1, wherein the router processor splits an outgoing data stream among more than one of the plurality of USB ports, and compiles an incoming data stream from more than one of the plurality of USB ports.

3. The system as claimed in claim 1, wherein the multiplexer/de-multiplexer at the local router and the second multiplexer/de-multiplexer at the smart antenna encode and decode in such a manner as to maintain one-to-one signal correspondence among the plurality of USB ports at the local router and the plurality of transceivers at the smart antenna.

4. The system as claimed in claim 1, wherein the multiplexer/de-multiplexer at the local router and the second multiplexer/de-multiplexer at the smart antenna encode and decode in such a manner as to shuffle signal packets among the plurality of USB ports and the plurality of transceivers.

5. The system as claimed in claim 4, wherein the shuffling of signal packets includes buffering.

6. The system as claimed in claim 1, wherein at least one of the plurality of transceivers is configured to operate in a different signal frequency from at least one other of the plurality of transceivers.

7. The system as claimed in claim 1, wherein the multiplexer/de-multiplexer circuits encode the USB signals onto a carrier power signal.

8. The system as claimed in claim 1, wherein the multiplexer/de-multiplexer circuits encode the USB signals in parallel with mode-of-control signals to and from the transceivers.

9. The system as claimed in claim 1, wherein the network cable is an AC power cable connected to the network ports via powerline network adapters.

* * * * *